(12) United States Patent
Murakami et al.

(10) Patent No.: US 6,725,221 B2
(45) Date of Patent: Apr. 20, 2004

(54) IMAGE DATA TRANSFER METHOD AND SYSTEM THEREFOR

(76) Inventors: Tatsuya Murakami, #106 Gaadenkooto, 2-1 Yahagi, Odawara-shi, Kanagawa-ken 250 (JP); Yasuo Kurosu, 1-37-7 Koyabe, Yokusuka-shi, Kanagawa-ken 238 (JP); Hiroshi Abei, Hitachi-higashi-naruda-ryoo, 72 Naruda, Odawara-shi, Kanagawa-ken 250 (JP); Kenichi Nishikawa, Hitachi-higashi-naruda-ryoo, 72 Naruda, Odawara-shi, Kanagawa-ken 250 (JP); Eiichi Hadano, #105 Gaadenkooto, 2-1 Yahagi, Odawara-shi, Kanagawa-ken 250 (JP); Kazumasa Nagai, 127-3 Nakazato, Ninomiya-machi, Naka-gun, Kanagawa-ken 259-01 (JP); Jun Nishiyama, 22-9 Naruda, Odawara-shi, Kanagawa-ken 250 (JP)

( * ) Notice: Subject to any disclaimer, the term of this patent is extended or adjusted under 35 U.S.C. 154(b) by 0 days.

(21) Appl. No.: 10/178,231

(22) Filed: Jun. 25, 2002

(65) Prior Publication Data

US 2002/0161746 A1 Oct. 31, 2002

Related U.S. Application Data

(63) Continuation of application No. 09/735,290, filed on Nov. 6, 1997, now abandoned, which is a continuation of application No. 08/535,425, filed on Sep. 28, 1995, now abandoned.

(30) Foreign Application Priority Data

Oct. 3, 1994 (JP) .............................................. 6-238304

(51) Int. Cl.[7] ............................................. G06F 17/30
(52) U.S. Cl. ................................. 707/10; 707/1; 707/3; 707/6; 707/101; 707/203; 707/204; 709/224
(58) Field of Search .............................. 707/10, 1, 100, 707/102, 3, 6, 203, 204, 104; 709/202, 224

(56) References Cited

U.S. PATENT DOCUMENTS

| 4,985,784 A | 1/1991 | Tsuboi et al. ............... 358/342 |
| 5,319,543 A | 6/1994 | Wilhelm ...................... 364/401 |

(List continued on next page.)

FOREIGN PATENT DOCUMENTS

| JP | 63-055790 | 3/1988 |
| JP | 63 220368 | 9/1988 |

(List continued on next page.)

OTHER PUBLICATIONS

The Journal of Information Processing Society of Japan, vol. 3, No. 5, pp. 478–485, Current Situation and Future of the Video Data Base for Medical Use by Nishihara.

*Primary Examiner*—Jean M. Cornielus

(57) ABSTRACT

An image data transfer method and system therefor transfer image data via network 10 connecting between a plurality of clients 100 and a server 400. A plurality of files are stored in image data base storage unit 430 and file search unit 420 searches the files to be processed by desired client from the image data base storage unit 430 in response to the search request of the client 100. The transfer protocol is sorted in transfer protocol storage unit 520 and transfer protocol management unit 150 transmits to a desired client via the network 10 the image data related to the file searched by the file search unit 420 specified the transfer protocol in the transfer protocol storage unit 520 based on the search request of the desired client.

21 Claims, 17 Drawing Sheets

U.S. PATENT DOCUMENTS

| | | | |
|---|---|---|---|
| 5,442,749 A | | 8/1995 | Northcourt et al. .... 395/200.09 |
| 5,493,677 A | | 2/1996 | Balogh et al. .............. 395/200 |
| 5,522,041 A | | 5/1996 | Murakami et al. ..... 395/200.01 |
| 5,552,901 A | | 9/1996 | Kikuchi et al. ............. 358/468 |
| 5,918,226 A | * | 6/1999 | Tarumi et al. ................ 707/10 |
| 5,940,829 A | * | 8/1999 | Tsuiki et al. .................. 707/10 |
| 6,032,124 A | * | 2/2000 | Saito et al. .................... 705/9 |
| 6,144,955 A | * | 11/2000 | Tsuiki et al. ................... 707/1 |

FOREIGN PATENT DOCUMENTS

| | | |
|---|---|---|
| JP | 2-140875 | 5/1990 |
| JP | 2-278458 | 11/1990 |
| JP | 5-257843 | 10/1993 |
| JP | 6-069953 | 3/1994 |
| JP | 6-205049 | 7/1994 |
| JP | 6-209460 | 7/1994 |

* cited by examiner

FIG. 4

| # | DOCUMENT NAME | IMAGE ID NO. | LOCATION OF STORAGE | DATA SIZE | KEY WORD |
|---|---|---|---|---|---|
| 1 | DOCUMENT A | #10011 | aaxxx1 | 52346 | ABX |
| 2 | DOCUMENT B | #10120 | aaxxx2 | 100292 | ABC |
| 3 | DOCUMENT D | #13110 | abxyy1 | 32678 | ACY |
| ---- | | | | | |

FIG. 9

| # | CLIENT ID | DOCUMENT NAME | STATE |
|---|---|---|---|
| 1 | 1 | DOCUMENT A | STEP 1 |
| 2 | 1 | DOCUMENT B | STEP 1 |
| 3 | 2 | DOCUMENT C | STEP 2 |
| 4 | 1 | DOCUMENT D | STEP 3 |
| 5 | 2 | DOCUMENT E | STEP 3 |

| # | DOCUMENT NAME | STATE |
|---|---|---|
| 1 | DOCUMENT A | STEP 1 |
| 2 | DOCUMENT B | STEP 1 |
| 3 | DOCUMENT D | STEP 3 |

| # | DOCUMENT NAME |
|---|---|
| 1 | DOCUMENT A |
| 2 | DOCUMENT B |
| 3 | DOCUMENT D |
| | ⋮ |
| | |

| # | DOCUMENT TITLE | IMAGE ID NO. | LOCATION OF STORAGE | DATA SIZE |
|---|---|---|---|---|
| 1 | DOCUMENT A | #10011 | HDD1 | 52346 |
| 2 | DOCUMENT B | #10120 | HDD1 | 100292 |
| 3 | DOCUMENT D | #13110 | HDD1 | 32678 |
| ⋮ | | | | |
| | | | | |

851 852 853 854 855

IMAGE DATA TRANSFER METHOD AND SYSTEM THEREFOR

This is a continuation of U.S. patent application Ser. No. 09/735,290 filed Nov. 6, 1997, which is a file-wrapper-continuation of U.S. patent application Ser. No. 08/535,425 filed Sep. 28, 1995 where both are abandoned.

BACKGROUND OF THE INVENTION

The present invention relates to image data transfer method and system therefor in the client/server computing system where still pictures of the document and moving pictures images are registered as image data into the server and the required image is transferred in response to the client request, and more particularly to the image data transfer method and system thereof, including the electronic mail wherein processing of the entire system is carried out by sequentially transmitting to two or more clients the image data such as still images of the document and moving pictures, based on a specified rule called "work flow".

The document filing system was a prior art system to store the document in the form of image data and to retrieve it by computers. For example, HITFILE-6500 has been a well known document filing system product. In the client/server system configured by using this filing system as a server, data are searched in response to each client requirement, and are transferred via the network.

Furthermore, a system called PACS (Picture Archiving and Communications System) is proposed in Japan. This system provides management of the image for medical use including roentgenogram used for diagnosis in the medical field as computer data, for example, "Current situation and future of the image data base for medical use" by Nishihara in The Journal of Information Processing Society of Japan V, 33, N 5, PP. 478–485.

Since much net work transfer time is required to send in a great deal of high definition images via the network, this publication proposes a method of transferring the data of the patient in advance to the terminal in the diagnosis room when diagnostic reservation has been made. The known case of this method is the image data system for medical use disclosed in Japanese Patent Laid-open NO.2-140875 (1990).

A system called Work Flow which replaces the flow of documents in the office by the data transfer on the computer is coming to be widely known in recent years, for example, electronic document approval system disclosed in Japanese Patent Laid-open NO.2-278458 (1990).

This system allows each user to provide processing in the step which the data corresponding to the document are transferred one by one between two or more computers connected by the LAN (local area network). In this work flow system, the data passage is managed according to the rules which are modeled steps of processing the relevant documents in advance.

Accordingly, the system knows the next data or its candidate to be requested by each client in the portion where the processing flow is managed. Normally, such management is provided by the software by the name of Flow Controller. The device where the software operates includes the server which stores the data.

The rule for document filing system and the system called PACS have not taken into account the system called Work Flow where the flow of the document in the system is replaced by the flow of data in the computer, namely, image data including still pictures of the document and moving pictures are transmitted between two or more clients.

In addition the rule for system called Work Flow has not taken into account the problem of sending the data to the client, using the information managed in the flow controller of the sever.

SUMMARY OF THE INVENTION

An object of the present invention is to provide a image data transfer method and system therefor, which has a high speed response to the user request by ensure that the highly probable next image data to be requested by each client is searched and sent from the server to the client in advance, in the client/server computer system including electronic mail by the name of Work Flow.

Another object of the present invention is to provide a image data transfer method and system therefor, the image data transfer system ensuring improved system availability factor by substantial reduction of the time between request made by the user for the image data to be processed and display of the data, in the client/server computer system including electronic mail by the name of Work Flow.

According to one aspect of the invention, there is provided an image data transfer system for transferring image data via the network connecting between a plurality of clients and a server, said server comprising:

(1) a image data base storage means to store the image data base having files;

(2) a file search means for searching at least the files to be processed by the desired client from the image data base having files stored in the image data base storage means;

(3) a transfer rule for storage means to specifying in advance and storing at least the transfer rule for to be transferred to each of the clients via the network at least for each file, with respect to the image data base having two or more files stored in the image data storage means; and (4) a transfer rule for management means for transmit to a desired client via the said network the transfer information specified by the transfer rule for stored in the transfer protocol rule for storage means;

thereby transmitting the image data related to the file searched by the filed search means to the desired client via the network, based on the transfer request from a desired client.

The following describes the steps of the data being sent to the client when the image data required by the client is supplied by the server and is displayed on the client, in the client/server type computer system.

(1) Request given by the client to the server to search (2) Search by the server, and reply of the search result and information on the position of the data in storage (3) Request given by the client to the server based on search result (4) Transfer of data via the network (5) Display of transferred data on the client screen Namely, steps of search and data transfer are required until the data is displayed after the request is given by the client to get the data to be processed. The configuration according to the present invention, however, requires only a very short time until the data is actually displayed, even when the relevant image data has a great capacity, without the user feeling that he is make to wait.

Especially in the client/server computer system in the work flow as in the present invention, the document image data are often used as data, and the job target comprises comparatively routine works in many cases.

In such cases, said configuration according to the present invention improves the response performances after specification of the document, and ensures substantial improvement in the operation efficiency of client/server computer system in the work flow, without being affected directly by the user productivity.

As shown by said configuration, the client/server computer system in the work flow according to the present invention, the majority of the implementation means are configured in the server, so all search activities are done by processing within the server, resulting in reduction of the number of communications via the network as well as reduction of network loads.

BRIEF DESCRIPTION OF THE DRAWINGS

FIG. 4 is a view showing of an example of the image data management table stored in the image data base;

FIG. 9 is a view showing an example of the management table;

FIG. 10 is a view showing an example flow information table corresponding to the unprocessed document list set for each client;

FIG. 12 is a view representing the unprocessed document name search result for each client;

FIG. 13 is a view showing an example of the search result to be output upon search of the image data;

DETAILED DESCRIPTION OF THE PREFERRED EMBODIMENTS

Figure 1:
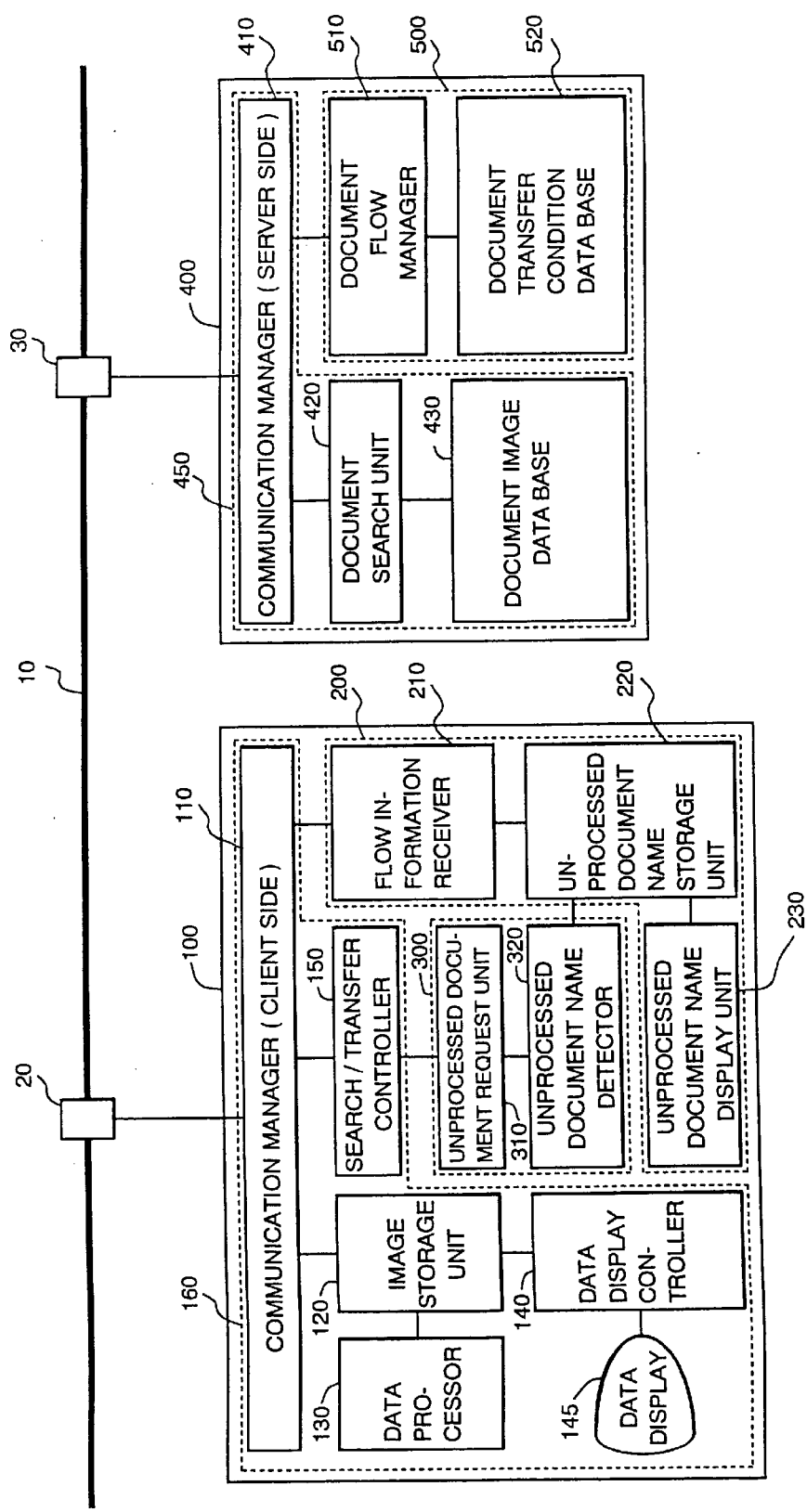
FIG. 1 is a schematic block diagram showing the first embodiment of the present invention, a work flow type client/server computer system with the prior search unit provided on the client side.

Referring to the drawings, there is shown an embodiment of the work flow type client/server electronic computer system including electronic mail according to the present invention.

Firstly, the principle of the present invention is described. There are two methods for realizing the present invention can be realized. The first method is explained with reference to FIG. 1. When network 10 is linked, client 100 implements the operations from search request to data transfer sequentially according to the instruction given to each of the client 100 from the work flow server flow manager 500 installed inside the server 400, without user decision.

According to this method, the majority of the implementation means are located on the client 100 side. In client 100, such means includes (1) the part 200 (work flow client) which is started when connected with server 400 and which reads out the information corresponding to the list of image data (data on still pictures of the document and moving pictures) to be processed as specified by server 400; (2) part 300 (prior search unit) including the search/transfer controller 150) to request the server 400 to search the relevant image data according to the information obtained therefrom; and (3) part 120 (image storage part) to implement read-out of the file corresponding to the result when the result searched by image search unit 420 (document search unit) is reported by server 400.

The instruction given to each client 100 by the work flow server flow manager 500 is written in the specified file or table on client 100 as a list of the document names to be processed.

Accordingly, on client 100 side, contents of the table are read out upon the establishment of the network, and request for search is each given by the search/transfer controller 150. When the search result is reported, the server 400 is requested to transfer the relevant data; this process is used for implementation.

Figure 15:
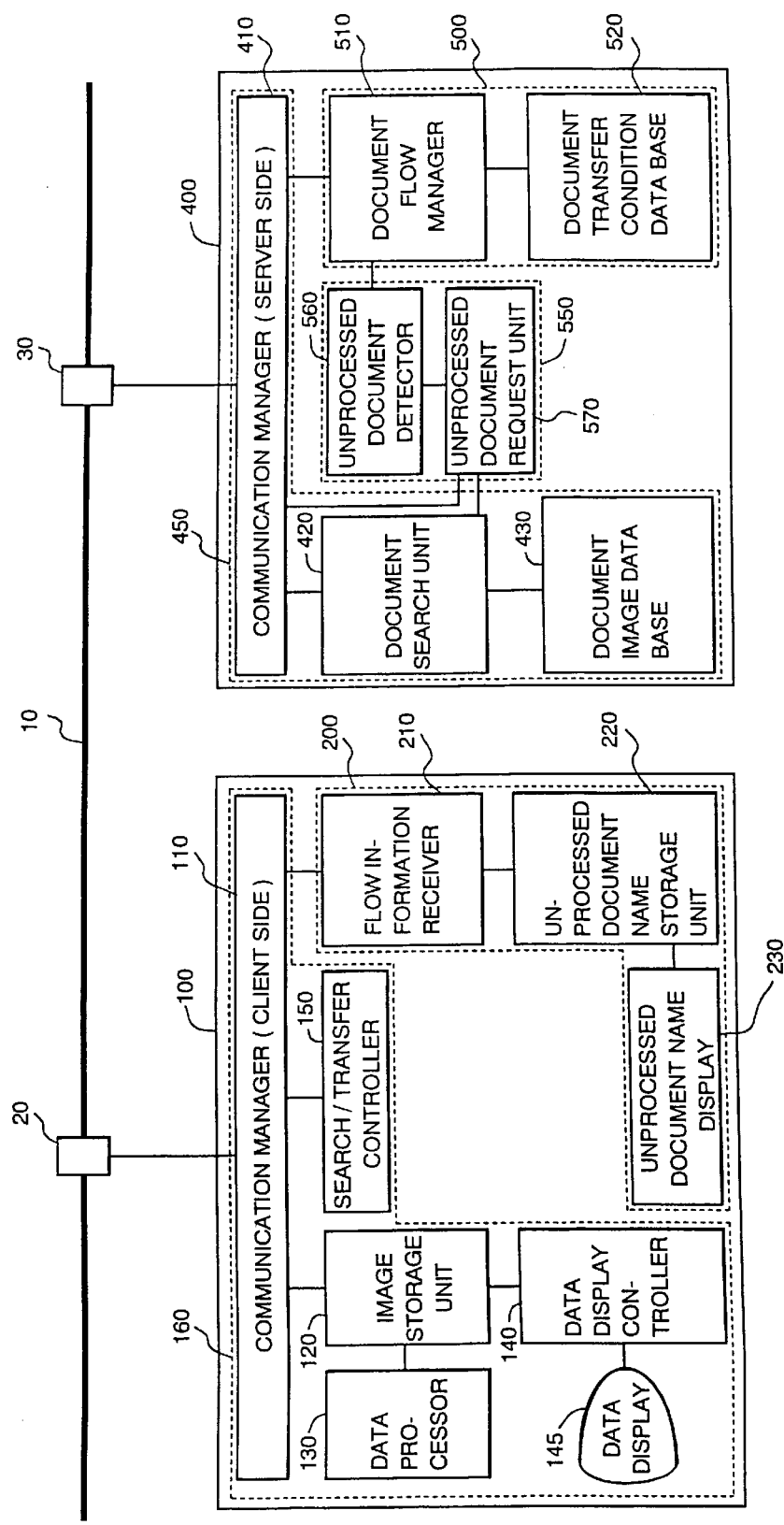
FIG. 15 is a schematic block diagram representing a second embodiment of the present invention, a work flow type client/server computer system with the prior search controller provided on the server side.

The following describes the second implementation method with reference to FIG. 15. According to this method, the items to be processed is detected inside server 400 directly for each client 100 by work flow server flow manager 500. When the relevant client 100 is connected, the relevant image data is sent from the server 400 to the client 100 via network 10. Implementation is ensured by this second implementation method, as a matter of course.

In this case, the majority of the implementation means are configured in the server. That is, the prior search controller 550 connected to the work flow server flow manager 500 creates and stores the list of documents instructed to be processed for each client 100. It reads out the list of documents stored in the prior search controller 550, and sets up the conditions required for search from the read-out list of documents (e.g. reading of the relevant document name).

Furthermore, search is implemented for image search unit 420. In the portion, the client is only connected without implementation. When the name of the data or file to be transferred has been gained as a result of search, the information is sent from the server to the relevant client to notify that the data will be transferred. Client 100 makes preparations to accept the file to be transferred, based on the particulars of the transmitted image data.

According to the second implementation method, all search activities are done by processing within the server, resulting in reduction of the number of communications via the network as well as reduction of network loads.

The following gives concrete description of the embodiment of the work flow type client/server electronic computer system including electronic mail according to the present invention with reference to drawings: According to the present invention, information required for prior search can be obtained on either the server or client. The following describes both the server and client with reference to drawings. Firstly, description will be given to the example of gaining information on the client featuring easier flow, and then to the method of gaining information on the server of higher efficiency.

FIG. 1 shows an embodiment of the basic configuration according to the present invention.

In the FIG. 1, network 10 connects between client 100 and server 400, and terminals 20 and 30 connects between client 100 and server 400. Client 100 comprises part 160 related to image search and display, part 200 to implement work flow function, and prior search unit 300 which detects a probable candidate for the next document to be requested according to the work flow management information characteristic of the present invention and requests search in advance. On the other hand, server 400 comprises the part 450 related to image search/response, and work flow server flow manager 500 which manages transfer of the image document according to the work flow.

The following describes the details of contents and functions of each part: As discussed above, this system comprises a work flow client 200 to implement the work flow function based on the image search system, a work flow server flow manager 500 and a prior search unit 300.

Figure 2:
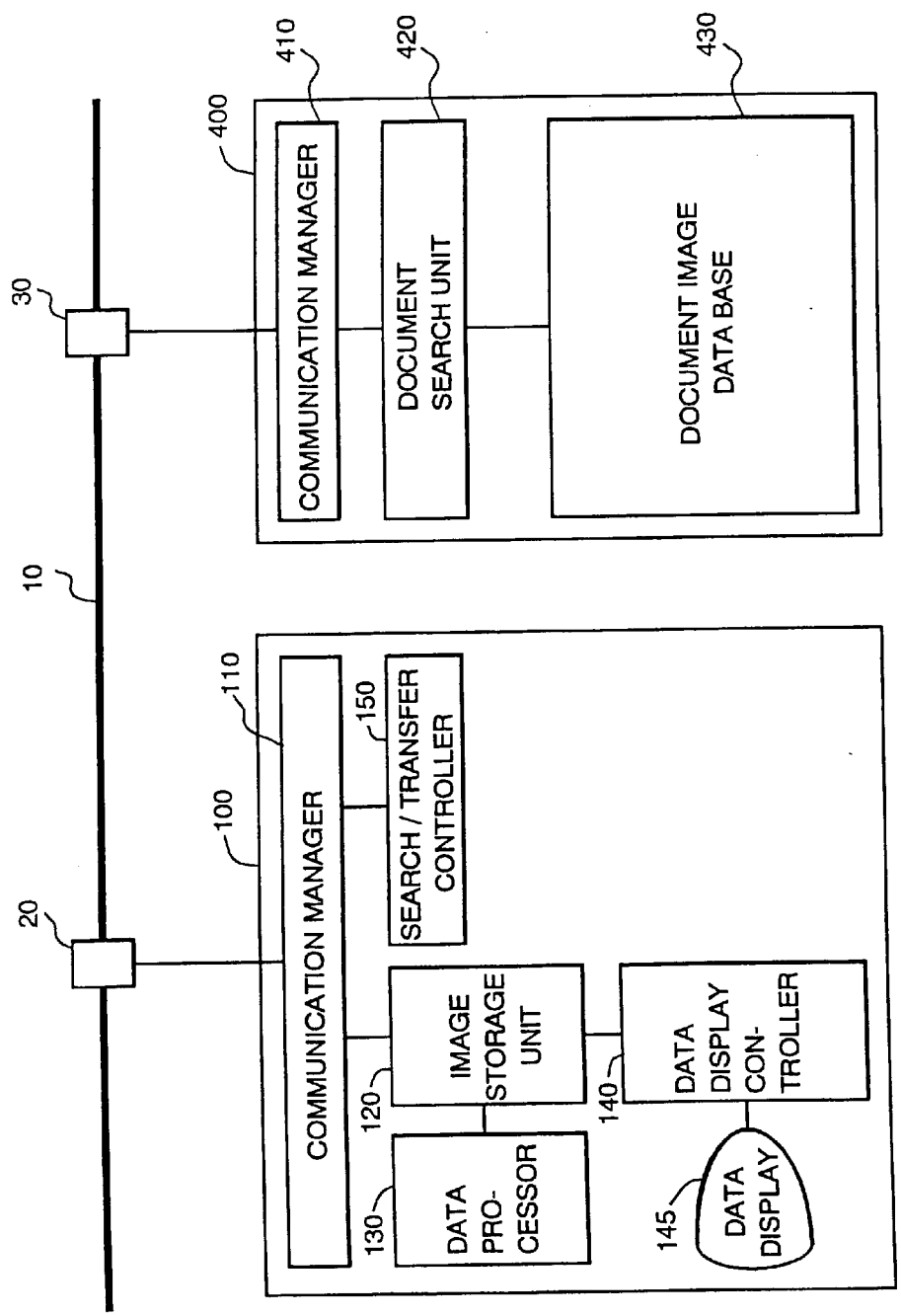
FIG. 2 is a schematic block diagram showing part of the image search system as constituting part of the present invention.

FIG. 2 illustrates the part handling the image data search/display in this system. In FIG. 2, client 100 comprises:

1) a communications manager 110 control communication with server 400 via the network 10;
2) a image storage 120 to store the image data sent from the server 400;
3) a data processor 130 to process the stored image data or accompanying data thereof (e.g. edit, enlarge/reduce, cut/paste, rotation and layout change, coloring);
4) a data display controller 140 to handle display the stored data and processed result;
5) a data display 145 to actually display the data; and
6) a search/transfer controller 150 to request search and image data transfer from the document image data base on the server 400 and to receive the search result.

The server 400 comprises a communications controller 410 to control communication via the network 10, a image search unit (document search) 420 to search the base data and a document image data base 430 to store a great amount of data. When the user has requested client 100 to search the required image data, image search unit 420 on server 100 selects the relevant data from the image data stored in the data base 430, and the data are sent to the image storage 120 on client 400 via the network 10.

Figure 3:
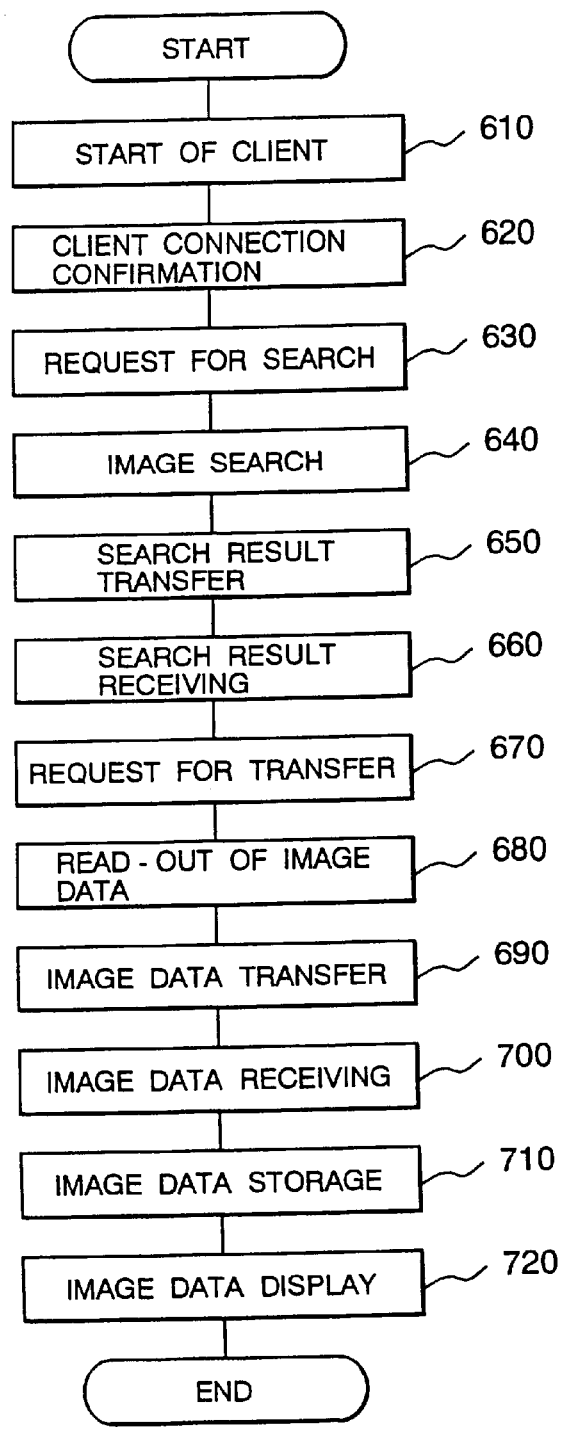
FIG. 3 is a flow-chart drawing showing image search system operation procedures.

The following describes the flow of the operation of each part with reference to FIG. 3: In this case, server 400 is assumed to have been started already. When the client 100 is started (610) and is connected to the server 400, their connection is confirmed (620). When the user requires the image data, search request is given by client 100 (630). This search request is executed by search/transfer controller 150. Search request by client 100 is sent to server 400 via the network 10, and is received by communications controller 410. In the server 400, the image search unit 420 searches the data on the document image data base 430 in the known manner in response to the search request sent from the client (640), and sends the search result to the client 100 (650 and 660).

According to the search result, client 100 determines whether transfer of said data is to be requested or not, and sends the transfer request if necessary (670). In response to this request, server 400 reads out the relevant image data including document in the image data base, and sends it via the network 10 to the client 10 which has requested it (690).

The client 100 stores into the image storage 120 comprising the memory and file the image data including the document which has been sent (710), and displays (720) it on the data display 145 including CRT by means of the data display controller 140. The image data including document which is transmitted to the client 100 pertains to image data on the client 100, and is provided with processing (e.g. edit, enlarge/reduce, cut/paste, rotation and layout change, coloring) by the data processor 130. Then it is again stored in the image storage 120 as new image data and, at the same time, can be registered in the document image data base 430 of the server via the communications manager 110, network 10 and communications controller 410.

A general data base technique can be used to manage the data in the document image data base 430. FIG. 4 gives an example of the table when the image data including document is managed by the management table.

In the FIG. 4, # 801, document name 802, image ID number 803, storage location 804, data size 805 and keyword 806 denote the items recorded in the table, while 811, 812 and 813 are the records assigned to respective documents (image data).

Search is implemented as follows: The item 806 is searched in the vertical direction for a condition e.g. keyword from the input client 100, and items including the document name 802 are sent to the client as search results. The user is not conscious of the storage location 804 normally.

It serves as pointer information used to read from the device storing the image data, e.g. from the magnetic disk when there is a request from client 100 to send said image data. The data size 805 is also an item necessary to read from the device storing the image data, e.g. from the magnetic disk.

In the document image data base 430, documents such as slips, documents such as reports and circulares used in the work flow for example, are input by the image input device including the image scanner connected to client 100 or server 400; at the same time, the record shown in FIG. 4 is also input by an input means including the keyboard and is stored in the magnetic disk or the like.

The present invention provides a client/server computer system called Work Flow including the electronic mail; it is designed to transfer the document image data to users, similarly to the actual flow of the document, so that each user provides processing. The Work Flow is based on the condition that the image data to be sent to a particular user (client) and the destination (client) of a particular image data to be sent next are known in advance.

In the client/server computer system called Work Flow, documents to be processed next are listed up for each user.

The user select the document from the list and receives the desired document in the form of image data. Then the user sends it back to the server after providing the following processing on this image data for example, stamping on the document (image of the stamp to be synthesized), and addition (e.g. to input the document by the input means such as keyboard and to convert it into image by the code/image conversion means, thereby synthesizing it to the image data (pasting); to divide the file into two parts and to link them (association), thereby superimposing them; in the case of moving pictures, to input sound by the sound input means and to link it with the moving picture (association)).

Figure 5:
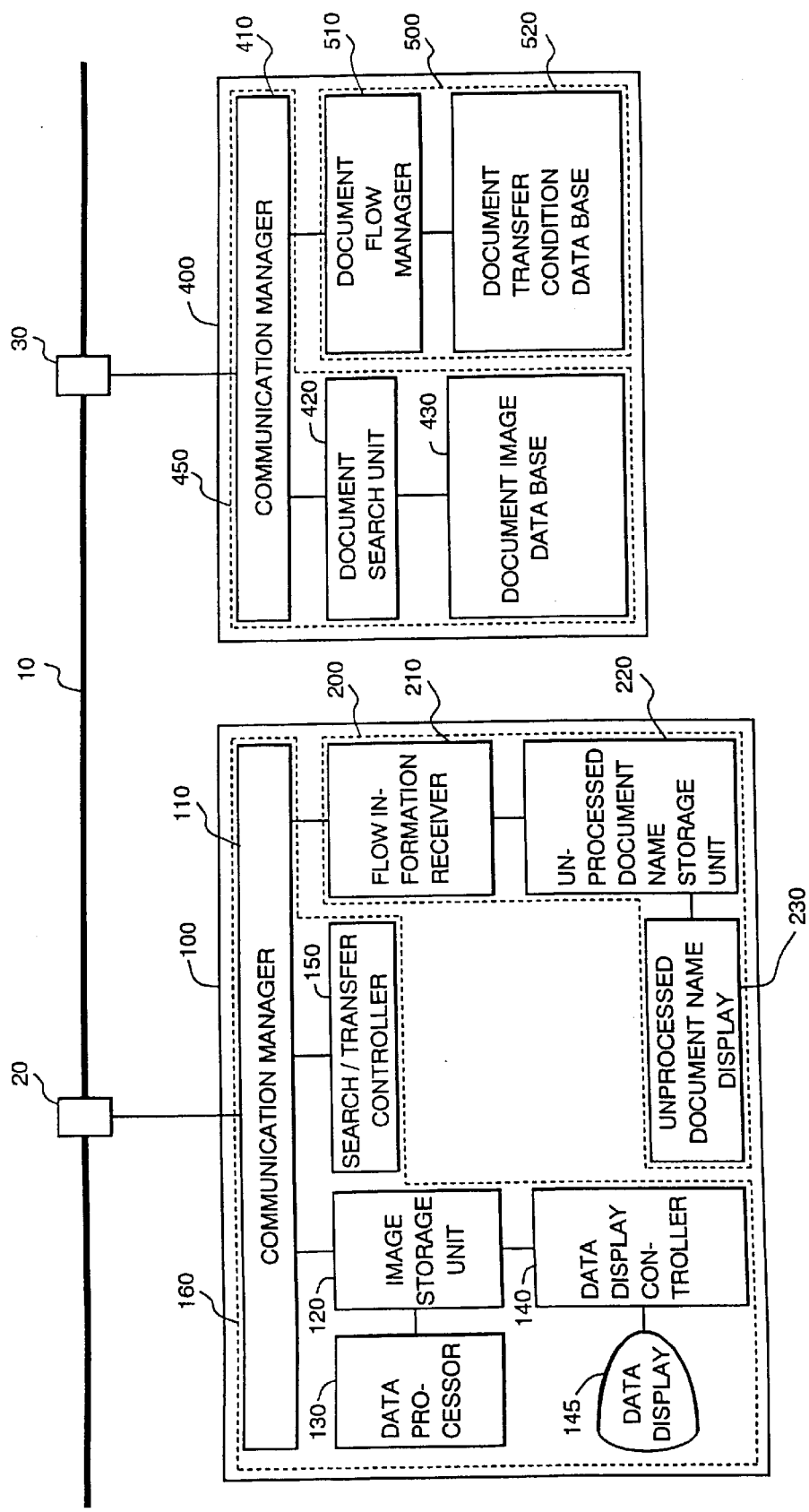
FIG. 5 is a schematic block diagram representing the configuration in the combination of the work flow as one of the characteristics of the present invention and image search system.

FIG. 5 illustrates an embodiment of the client/server computer system configuration loaded with this Work Flow function.

In the FIG. 5, the dotted portion shown by work flow client 200 on the client side and the work follow server manager 500 on the server side is loaded to realize the work flow function, in addition to the image search system shown in FIG. 2.

The document flow manager 510 on the server side takes change of the managements to determine which image data including document should be sent to each client 100. The document flow manager 510 manages the flow of the stored image data including document to be circulated to the users in charge of processing according to the specified rule (circulation sequence, circulation route, conditions for advancing the document (e.g. the document to be advanced if the approval stamp has been given at a specified position (client) or the document to be discarded at the expiration of the time period); the document flow manager 510 manages the document (image data) to be sent to a particular user as well as the destination (client) of a particular image data to be sent. To put it more concretely, the name of the image data including document to be processed by the user is supplied as a unprocessed document to the flow information receiver 210 on the client 100 used by the relevant users.

The document name (name of the image data including document) sent to the flow information receiver 210) is registered as a list at the unprocessed document name storage 220, and is displayed in the form of a list on the screen of the CRT data display 145 by the function of the unprocessed document name display 230.

The user selects the next document to be processed from the indicated list. As a result, the search/transfer controller 150 of the client 100 requests the relevant document image data to be searched, and the data is searched by the image search unit 420 from the document image data base 430 in the server 400; then the portion corresponding to the image data or program is sent to the client 100.

In the FIG. 5, both the document image data base 450 and work flow server flow manager 500 are loaded on one and the same server 400. They each can be mounted on separate computers. In this case, it goes without saying that both computers require communications controllers 410. Furthermore, the system processing capabilities are enhanced by dividing the server 400 in this way, depending on the target of application.

As discussed above, the destination of the image data including document to be sent is defined by the preset rule, which is stored in the document transfer condition data base 520 of the server 400. The contents of the document transfer condition data base 520 must also be input by the input means connected to the client 100 or server 400 and stored in the magnetic disk, for example, with consideration given to work flow, according as the document image data base 430 is created and stored.

Naturally, server 400 must be connected with the display means including CRT, and modification must be made to allow display for the stored document image data base 430 as well as the document transfer condition data base 520.

Especially the document transfer condition data base 520 provides a work flow rule (a rule on the flow of the image data including document according to which registered image data including document is circulated to the users in charge of processing one after another); it is not fixed and must be modified whenever required.

Figure 6:
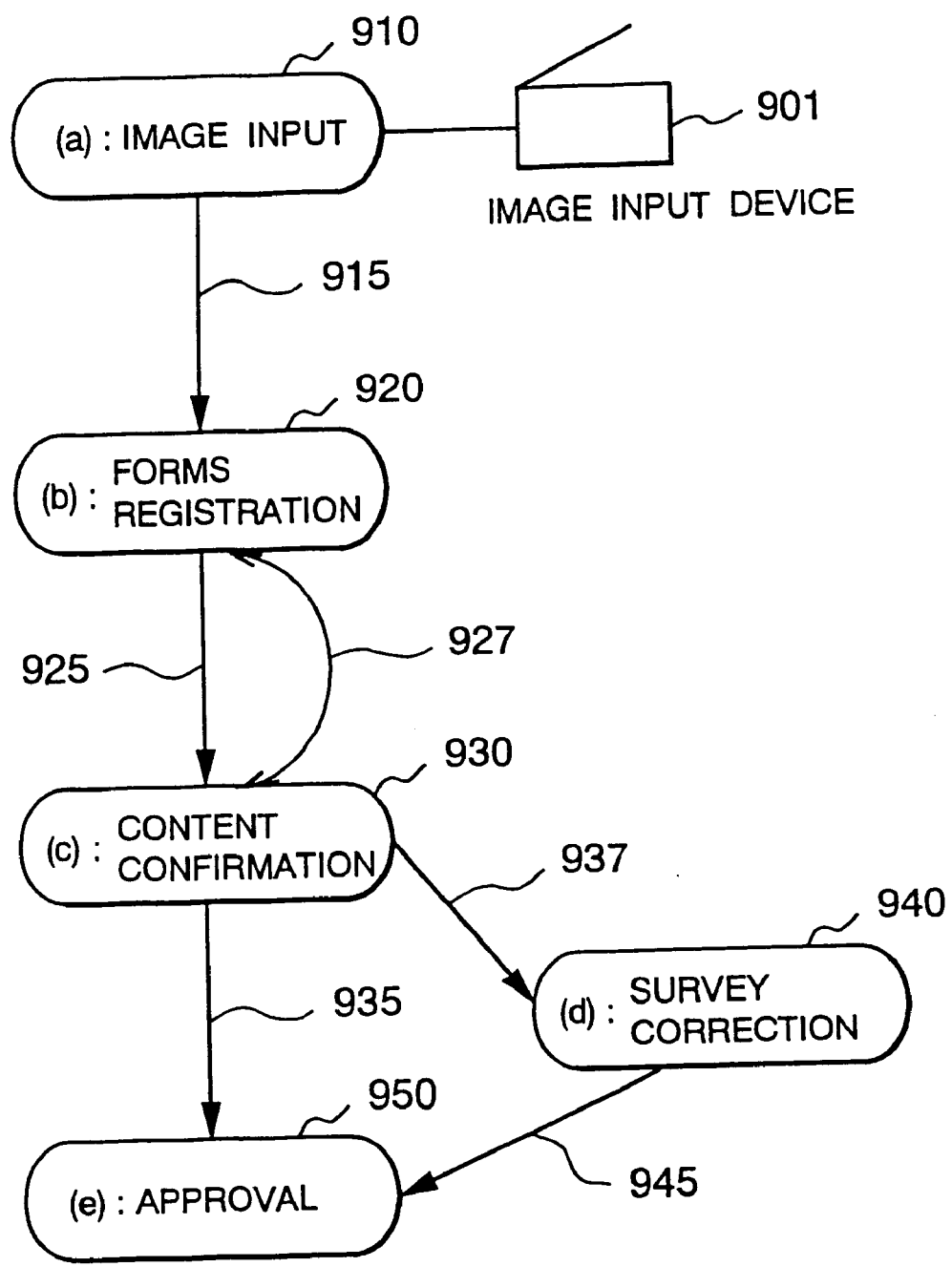
FIG. 6 is a flow-chart showing the movement of the document image data in the work flow.

The following describes the document flow with reference to FIG. 6.

In the FIG. 6, image input 910, forms registration 920, content confirmation 930, survey correction 940 and approval 950 denote processing in the user and client. The document is firstly read in as a image data from the image data input device 901 including the image scanner connected to the client, and the read document is registered in the document image data base 430 of the server 100 by client 910. It is clear that the document need not necessarily be input from client 100; it can be read as image data from the image input 910 including the image scanner and registered in the document image data base 430.

Document transfer condition data base 520 of server 400 stores the route where the image data including document flows for each document type, and the conditions for proceeding to the next step (e.g. proceeding allowed if an approval stamp is given at a specified position (client), or the document discarded after expiration of the time period).

In FIG. 6, the route where the image data including document flows is composed of 915, 925, 927, 935, 937 and 945. As illustrated, all the image data registered in the client 910 are subjected to forms registration processing by client 920 in the following step. To be more concrete, when the user (client) corresponding to the step of 920 has been connected to the server, the just registered document name is transmitted to the flow information receiver 210 as unprocessed document. The process corresponds to the movement represented as 915 in FIG. 6. When the user (client) corresponding to the step of 920 has completed processing of the forms, the processed image data is again returned to server 400.

However, this means only declaration of the end of processing for the user. Transfer to server 400 is provided by the search/transfer controller 150. After completion of processing in the step of forms registration 920, the document flow manager 510 of the server 400 refers to the document transfer condition data base 520, and regards the step of handling this document in the next step as the step 930. The document flow manager 510 transmits it as unprocessed document to the flow information receiver 210 of the client which said user is utilizing, immediately if said user (client) is connected to the server 400 at that time, and when it is connected if it is not connected at that time.

Result of processing reveals that three routes are available in the step of content confirmation 930. If there is no problem as a result of confirmation, the document name is sent via route 935 to the unprocessed document list (unprocessed document name storage 220) of the client of the user, corresponding to the step of approval 950 in order to get approval 950. If it contains wrong contents and forms registration must be done again, it is returned to the step of forms registration 920 via route 927. If the contents require survey, the document name is set to the step 940 corresponding to the survey and modification via 937 to order to be sent to the client which the user in charge is utilizing.

Figure 7:
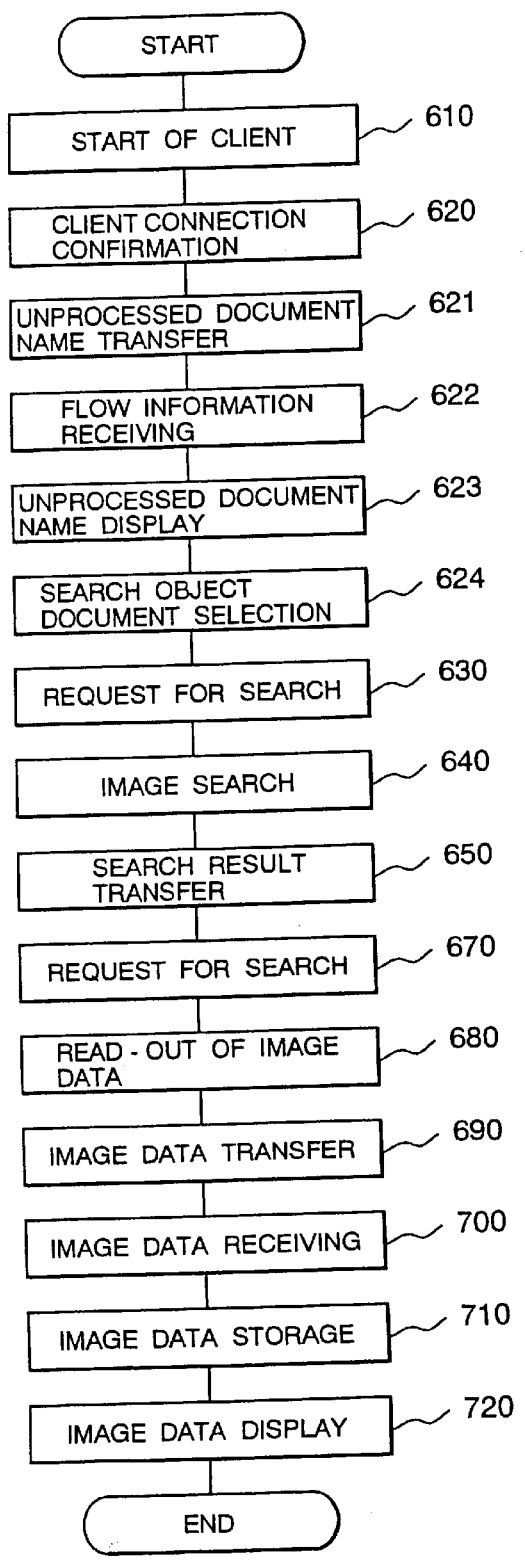
FIG. 7 is a flow-chart representing the image search system operation procedures when the work flow is incorporated.

Switching of the transfer destination is determined by the document flow manager 510 of the server 400, depending on the content done by processing 930. Accordingly, the user (client) in charge of processing 930 can declare the end of processing, without being conscious of the transfer destination, and can only send the data back to server 400. The flow given in FIG. 7 is used to describe the process until image data is transferred to each client 100 at this time.

After completion of client start 610 and server connection confirmation 620, server 400 identifies the user (client) according to the user name input at the time of connection, and transfers (621) the name of the document to be handled by the user (client) to the flow information receiver 210 of the client as unprocessed document name, based on the document transfer condition data base 520.

Client 100 receives (622) the transmitted document name through the flow information receiver 210, and stores it in the unprocessed document name storage 220; then it displays (623) the list by means of unprocessed document name display 230.

When the user selects (624) from the displayed list the next document to be processed, the search/transfer controller 150 sends (630) to server 400 the request to search the document. In the server 400, the requested search is implemented by image search unit (document search) 420 (640), and the result is sent to client 100 (650). In this case, the corresponding image data can also be sent to the client, following the search result, similarly to the image search system shown in FIG. 2.

When the client 100 sends (670) back the transfer request to the server 400 as required, depending on the search result, server 400 reads (680) out the relevant data from the document image data base 430, and transfers the image data to the client 100 according to the procedure similar to that of the said image search system.

Namely, the process is required until the image data is actually displayed (720) after the document to be processed is specified (624) by the client.

Figure 8:
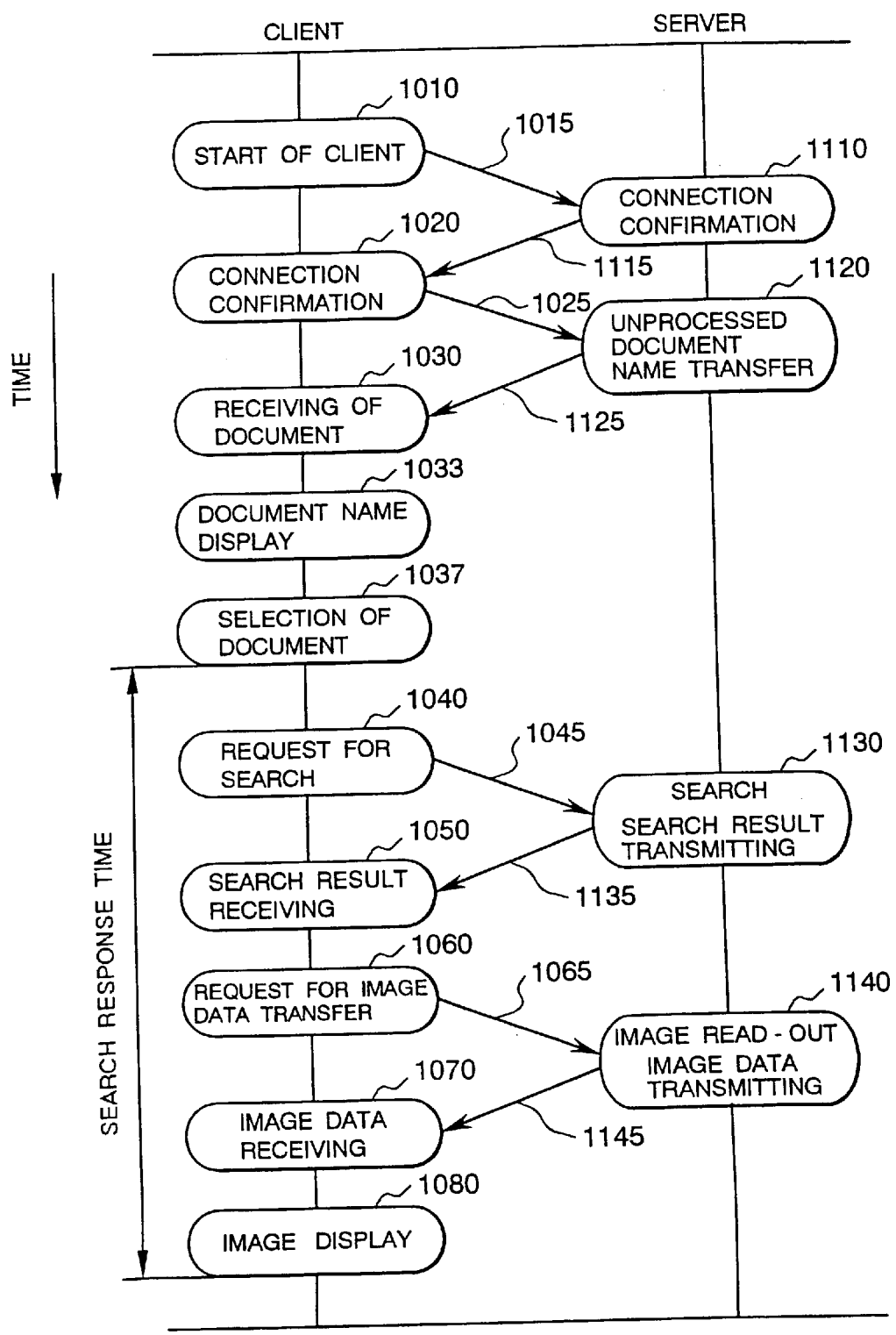
FIG. 8 is a time chart showing the linkage of the operations between the server and client.

FIG. 8 shows the timing of communication between the server and client during this period. After the client 100 is started (1010), connection is confirmed (1020) by communication (1015) and (1115) with the server 400; then the name list of the unprocessed documents to be handled by said user is sent from the server 400. In the client 100, the document name is received (1030) by the flow information receiver 210, and is stored in the unprocessed document name storage 220. The unprocessed document name display 230 displays (1033) the list, and the user selects (1037) the document to be processed. Selection by the user allows the search/transfer controller 150 of the client to request (1040) the server 400 to search. In response to the request, the image search unit (document search) 420 of the server 400 searches inside the document image data base 430, and reports (1130) the result to client 100.

Having received (1050) the result, the search/transfer controller 150 of the client controls said result by means of the data display controller 140, and displays it on the data display 145; then the user determines if image data transfer should be requested or not. Having received the instruction that the user requests (1060) the image data to be transferred, the server 400 reads out the image data from the document image data base 430, to transmit (1140) it to the client 100. The client 100 receives this data through the image storage 120, and controls it by means of the data display controller 140, thereby displaying (1080) it on the data display (image data display) 145.

In the FIG. 8, time from 1937 to 1080 is required until the image data is displayed after the user selects the data to be processed as a result.

The state of the registered document and the next transfer destination are managed by the document flow manager 510 of the server 400. FIG. 9 illustrates an example of the document flow management table used as one of the management methods.

In the FIG. 9, 821 denotes the serial number, and 822 is a client ID representing the user by whom the relevant data is to be handled next; 823 shows the document name, and 824 is a symbol representing the current position in the process in the work flow. The list of unprocessed documents to be transmitted to each client can be created by picking up only the record of the specific client ID from this table.

The table in FIG. 10 is created at each step of processing managed by the flow. That is, it is a table recorded for each user and for each client. This table is created from the list of the unprocessed documents to be transmitted to the flow information receiver 210 of each client.

The document name 832 and symbol 833 representing the current status thereof are recorded here.

The present invention comprises the means provided with the search response time reduction function (300 in FIG. 1) loaded on the work flow type client/server computing system.

To illustrate it specifically, it comprises the unprocessed document storage name 220 to detect the next probable candidate to be searched from the unprocessed document list transmitted to the client 100, and the flow information request unit 210 which, based on the result of said detection, requests the search/transfer controller 150 to search the target document and to transfer image data.

Figure 11:
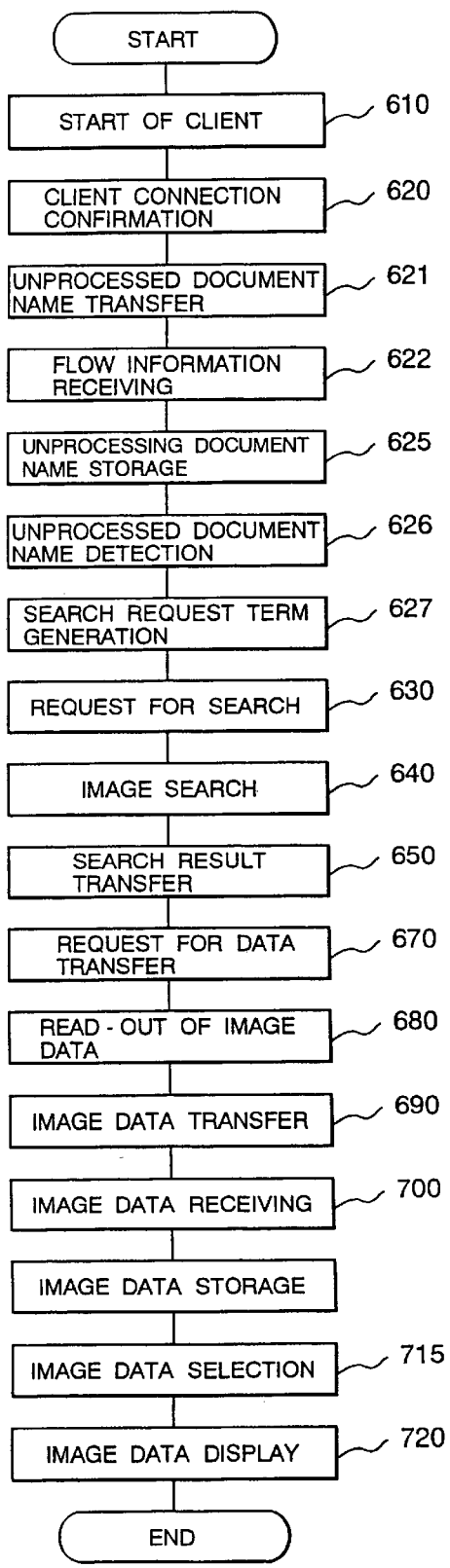
FIG. 11 is a flow-chart showing the flow of the operations of the present invention.

The following gives a more detailed description of the operation of the present invention with reference to FIG. 11. Start (610) of the client and connection confirmation (620) with server are the same as above. Here the server 400 can be known from the user information to be input when the user of the connected client 100 is connected.

The unprocessed document name to be handled by the relevant user is transmitted (621) from the document flow manager 510 of the server and is received by the target client 100 through the flow information receiver 210.

The name of the unprocessed document obtained through the flow information receiver 210 is stored (624) by the unprocessed document name storage 220. Generally, the list provided by the unprocessed document name storage is displayed on the table of the data display 145, using the function of the unprocessed document name display 230; then the user selects the next data to be processed.

According to the present invention, the unprocessed document name detector 320 picks up (626) the document name from the contents of the unprocessed document name storage 220, and generates (627) search request items to request the server to search the corresponding document through the flow information request unit 210, thereby issuing search request to the server through the search/transfer controller 150.

Using the requested item, the image search unit 420 of the server 400 searches (640) inside the document image data base 430, and reports (650) the result to client 100.

Immediately when the client 100 having received the search result returns (670) the data transfer request, the server 400 reads out (680) the target image data from the document image data base 430 stored in the storage device such as magnetic disk, using the result of the latest search, and transfers (690) to client 100. Having received (700) the sent data, the client 100 stores it in the image storage 120.

When the user has selected a image data from the unprocessed document name list displayed on the unprocessed document name display 230, the client 100 uses the data display controller 140 to display (720) on the data display 145 the corresponding data from the image data stored in the image storage 120.

Immediately when the user has selected a image data from the unprocessed document name list displayed on the unprocessed document name display 230 as a result, the next image data to be processed, out of the image including the unprocessed document, is displayed.

The unprocessed document name is sent from the server 400. As described above, the management table as shown in FIG. 9, for example, is sent to the flow information receiver 210 of the client from the document flow manager 510 of the server 400, and is registered in the unprocessed document name storage 220. The unprocessed document name storage 220 can pick up only the information (e.g. the unprocessed document name addressed to user) necessary to identify the document, thereby achieving the intended object. For example, the simplest the unprocessed document table is the one shown in FIG. 12. Only the unprocessed document name addressed to the user is recorded.

On the other hand, the management information of the data corresponding to the unprocessed document of each client is obtained as the result of searching in the server 400. FIG. 13 gives an example thereof. In the Figure, items registered in the management table include the storage location information (854) required for data reading, and the data size (855) to be notified to the client prior to transfer, in addition to the document name (852) and ID number (853) for document identification.

Figure 14:
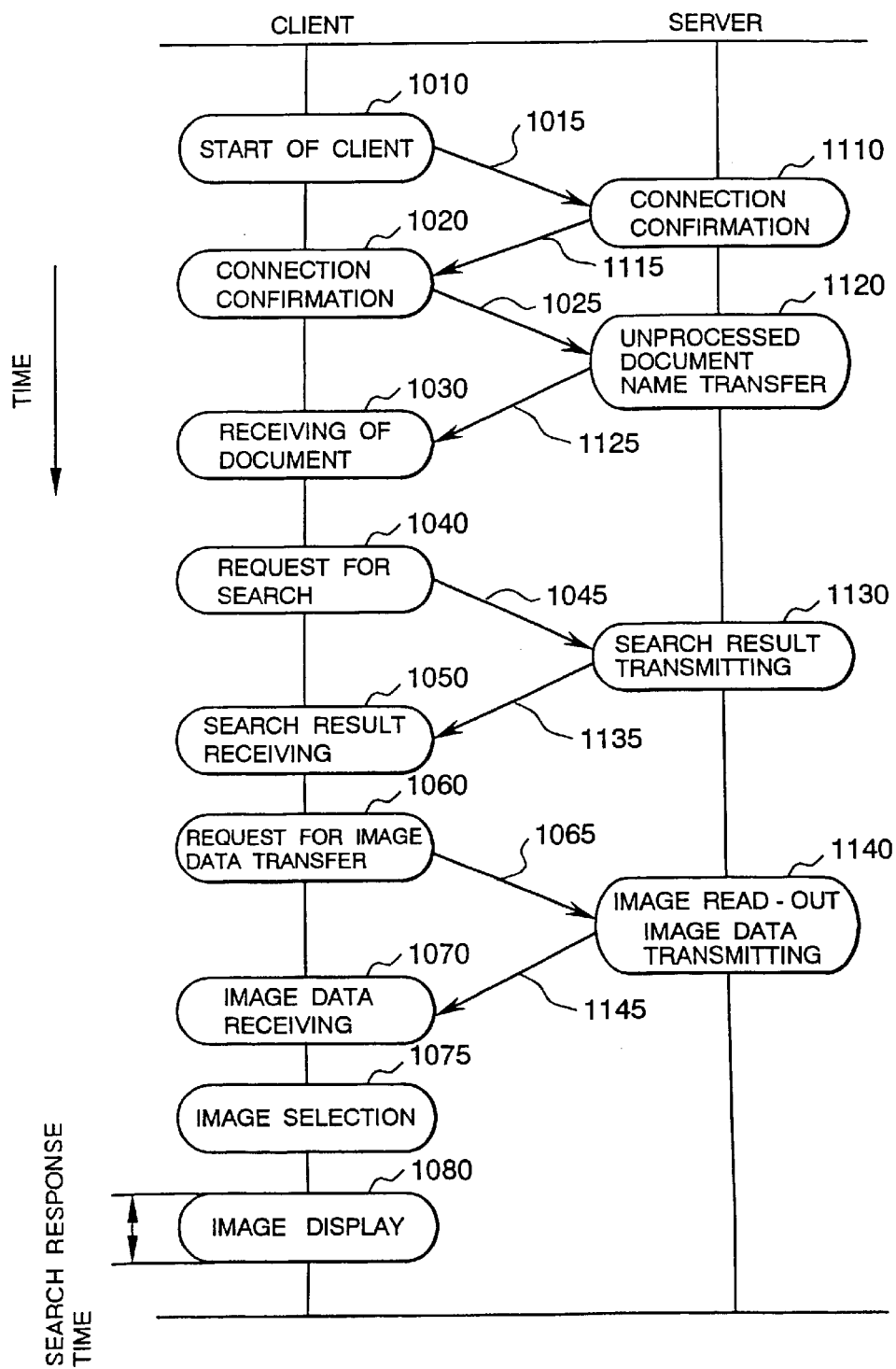
FIG. 14 is a flow-chart showing the linkage of the operations between the server and client in the embodiment of FIG. 1.

The following describes the communication status between the client and server according to the present invention with reference to FIG. 14:

Similar to the system described above, after the client 100 is started (1010), connection with the server is confirmed (1110 and 1020). When connected, the user (client) is specified, and the list of the image data to be handled by the user (client) is transmitted (1120) as unprocessed document information (e.g. document name).

Client 100 receives the unprocessed document information (e.g. document name) through the flow information receiver 210, and stores it in the unprocessed document name storage 220. From said unprocessed document information (e.g. document name), the unprocessed document name storage 220 detects only the information (e.g. the unprocessed document name address to the user) required to identify the document, and requests (1040) the image search unit (document search) 420 through the search/transfer controller 150 to search the image data of only the information (e.g. the unprocessed document name address to the user) required to identify the document detected from the unprocessed document request unit 310. When the search result is reported (1050), the search/transfer controller 150 of client 100 requests (1060) the server 400 to transfer the image data, and the sent image data is stored (1070) in the image storage 120.

When the user selects (1075) the next image data to be processed from the unprocessed document name list displayed on the unprocessed document name display 230, the image data already stored in the image storage 120 inside the client is displayed (1080) as it is.

As a result, display is given immediately when the user has selected the vide data, ensuring a work flow type image data transfer system featuring easy operation and use. In this case, if means are provided to ensure that the search/transfer controller 150 of the client can request (1040) the image search unit (document search) 420 to search unconditionally, or that the search/transfer controller 150 of the client can request (1060) transfer to the image search unit 420 unconditionally, then this system will be a work flow type client/server computer system where all image data notified as unprocessed document are transferred to the client simultaneously with the client connection.

According to the present invention, apparent response speed is enhanced by completing data search and transfer by the time when the user has selected the data. Furthermore, self-issue of the request for search and transfer on the server side will lead to reduction in the request having been sent via the network and the communication on management information, hence reduction in system load.

FIG. 15 shows another embodiment of the work flow type client/server computer system. The difference between FIG. 15 and FIG. 1 is that the prior search unit 300 located on the client in FIG. 1 is placed on the prior search controller 550 over server 400 in FIG. 15.

Similar to the prior search unit 300, the prior search controller 550 comprises the unprocessed document detector 560 and the unprocessed document request unit 570. The unprocessed document detector 560 detects the unprocessed document name from the document flow management table handled by the document flow manager 510 for each user (each client), and creates the unprocessed document name list.

The unprocessed document request unit 570 has the function of requesting the image search unit (document search) 420 to search the image data base according to the unprocessed document name list, and instructing the communications controller 410 to transmit the target image data to the client of the user, based on the search result.

Figure 16:
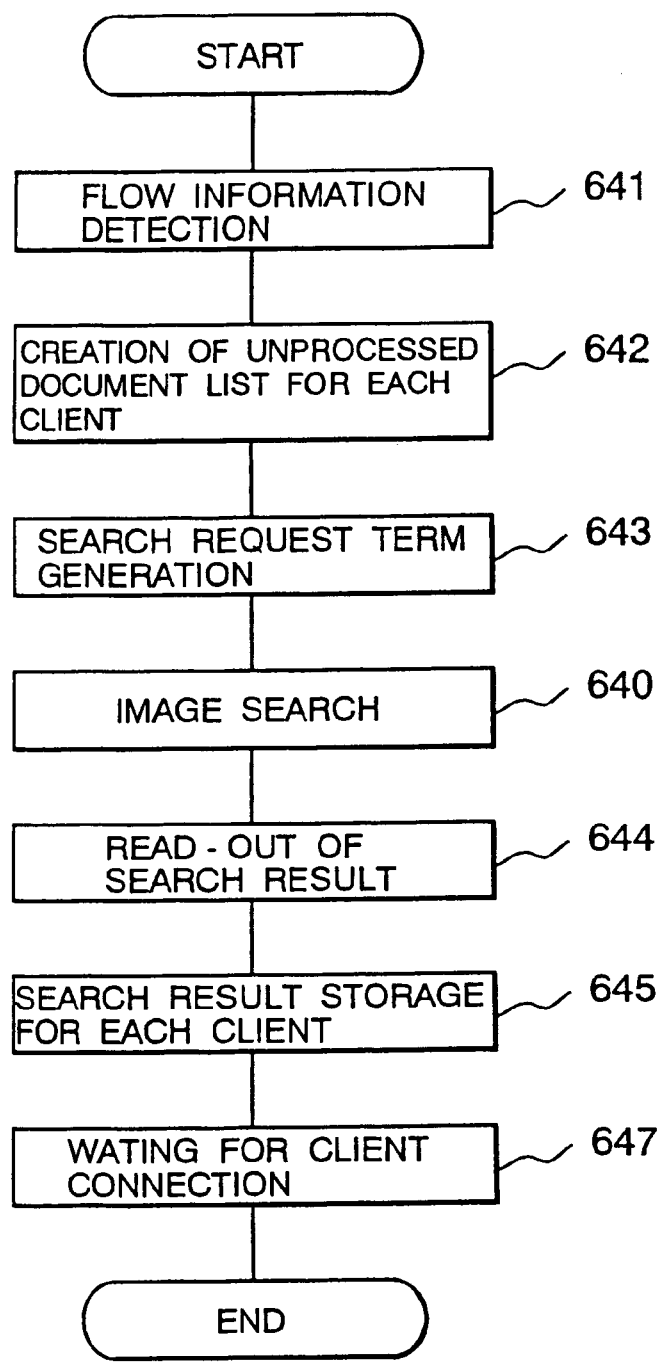
FIG. 16 is a flow-chart showing processing procedures inside the server in the embodiment of FIG. 15 when prior processing is implemented on the server side.

In this case, server 400 can search the image data including document for each user before the client 100 is connected. The following describes the flow of this operation with reference to FIG. 16.

Server 400 detects (641) the flow information from the document flow manager 510, and creates (642) the unprocessed document list for each client based on the detected flow information. Using the created list, the unprocessed document request unit 570 sets the conditions required for search, and requests (640) the image search unit (document search) 420 to search.

Furthermore, based on the search result obtained above, the search result list is stored for each client, thereby waiting (647) for the relevant user being connected.

Figure 17:
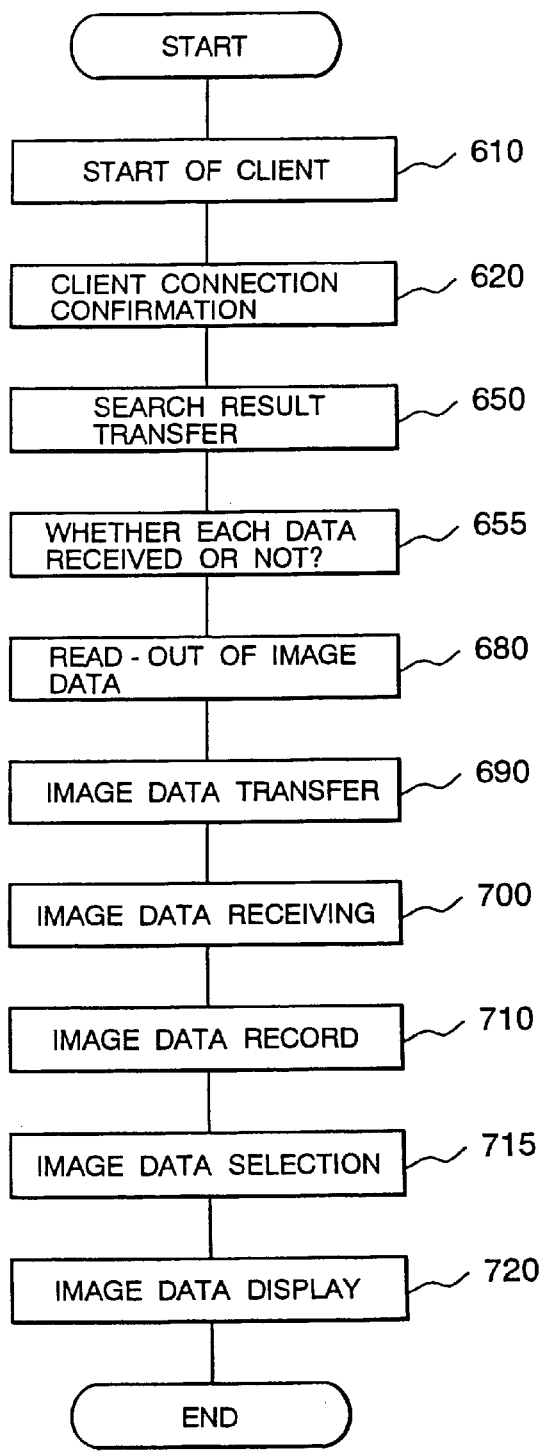
FIG. 17 is a flow-chart showing processing procedures inside the client in the embodiment of FIG. 15 when prior processing is implemented on the server side.

With reference to FIG. 17, the following describes the flow after the client is started. After confirmation (620) of connection with the server, the server 400 receives (650) the result of search already completed. The search/transfer controller 150 on the client 100 identifies the size of the target data, and determines for each data whether it can be received or not. The result is reported (655) to the image search unit (document search) 420 of server 400.

The server 400 reads out the required image data from the document image data base 430 and transfers (690) it to the client 100. Receiving (799) that image data, client 100 stores it in the image storage 120. The unprocessed document list of the client detected by the unprocessed document detector 560 of the server 400 is also sent to the flow information receiver 210, and is stored in the unprocessed document name storage 220, to be displayed on the unprocessed document name display 230.

When user has selected (715) one or more data from the unprocessed document list displayed on the unprocessed document name display 230, the client 100 displays (720) on the data display 145 through the control of the data display controller 140 the image data which is already received and stored in the image storage 120.

Figure 18:
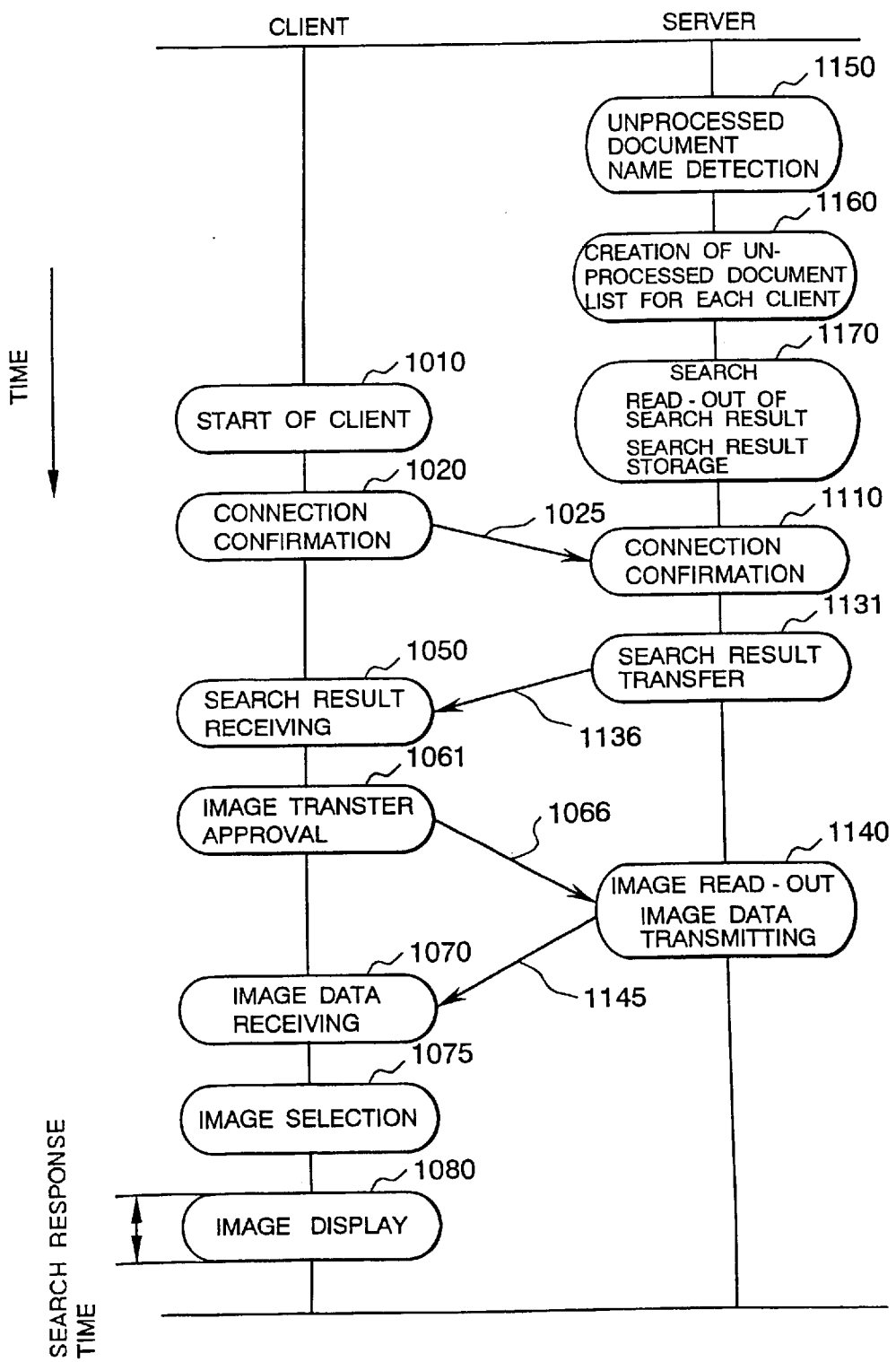
FIG. 18 is a time chart showing the linkage of the operations between the server and client in the embodiment of FIG. 15 when prior processing is implemented on the server side.

The configuration eliminates the need of giving instructions at the time of search request via network 10, as illustrated in FIG. 18. This feature eliminates the network load.

As shown in FIG. 18, the unprocessed document list for each client is created and data is searched (1150, 1160 and 1170), without waiting for connection of the client 100 on the server 400 side.

Receiving part of the unprocessed document specified by each client 100 requires approval (1061) of image data transfer is required. Unconditional receiving of all image data eliminates the need of this process and report (1066), making a further contribution to reduction in network load.

Handling by any one of many users may be sufficient, depending on the document to be handled in actual work. Use of such method alone for such a document will cause all image data to be transferred to the first user (client) which is connected to the server.

To avoid this, it is necessary to add the item which determine whether one user or two or more users are to handle the document in the next step, as a item of the unprocessed document list for each client sent from the document flow manager 510. Furthermore, the unprocessed document detector 560 and the unprocessed document name detector 320 are made to operate only when the number of the users is one.

The number of users who can be in charge of handling the document in the next step is defined in a document flow rule, and is stored in the document transfer condition data base, in preparation for implementation.

Furthermore, when the unprocessed document list is displayed according to the similar additional information, it is effective to attach an identifier to the data which may be handled by any one of the users, so that the users can identify such data.

An example of the application of the present invention can be found in the case when a great amount of forms (documents) are to be handled by a great number of persons. In this case, there is no need of controlling the document flow according to a specific rule; a series of forms provided with serial numbers are distributed sequentially to each client.

Figure 19:
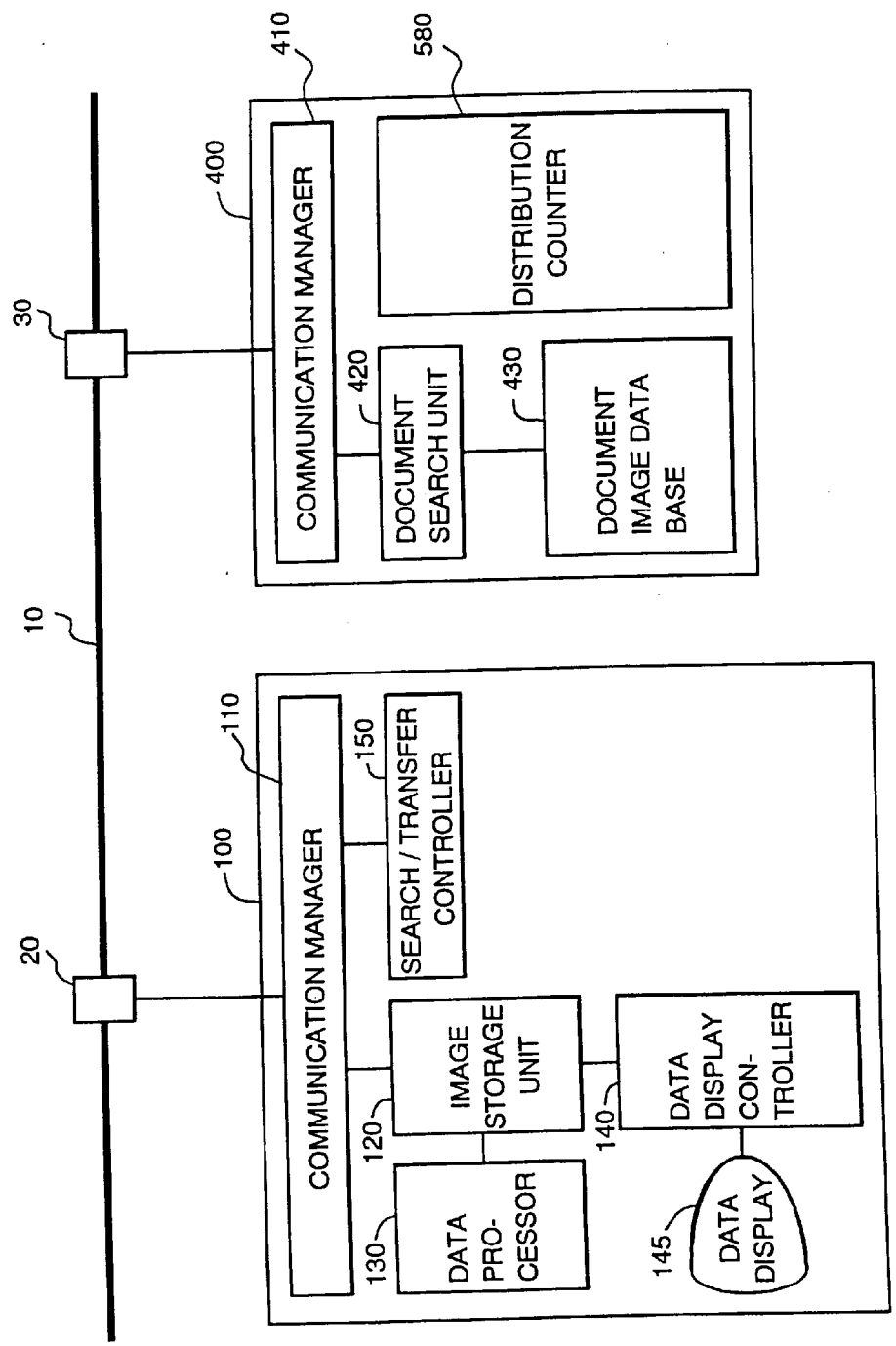
FIG. 19 is a schematic block diagram representing a third embodiment of the present invention, a work flow type client/server computer system where image data are distributed sequentially to each client.

FIG. 19 illustrates an example of system configuration for this processing. In the FIG. 19, a distributor 580 assigns sequentially a group of data arranged in a row to each client. Thus, the communications controller 410 transfers the relevant image data unconditionally to the client 100 determined by the result of this distribution. In this case, problems can be solved by using the configuration where server 400 takes an initiative to transmits the data unilaterally, without the client 100 requesting search of the image data or the like.

In actual use, when image data provided by each user has been processed and processed image data has been returned to the image data base of the server again, completion of preparation for reception is notified to the server 400, and the server 400 transmits the data sequentially to the client 100 which is ready to receive the data.

The image data in this case are able to be distributed in two ways: The image data are distributed only to the client connected at each time point; or they are distributed also to the clients which are normally connected to the network but which happen to be off (not started).

When data are to be distributed also to the clients which are off, the image data to be sent to the clients which are not ready to receive data are stored in the distribution counter on the server side as a table for each client in the same manner as the unprocessed document list, and data are sent to the target clients when the relevant user is connected.

In the work flow type client/server computer system, the present invention improves response characteristics in comparatively routine jobs such as work flow jobs and enhances system availability by apparently substantial reduction in the time required until the image data to be processed is displayed after the user has requested it.

Furthermore, the present invention allows the work flow type client/server computer system to detect the data to be processed for each client directly through the flow manager inside the server; then the desired image data is sent to the client from the server when the relevant client has been connected, thereby ensuring reduction in the number of communications via the network, hence reduction in the network load.

What is claimed is:

1. A data transfer system comprising:
   (a) a plurality of clients;
   (b) a server; and
   (c) a network coupling said plurality of clients and said server, said server transferring data over said network to said clients, said server comprising:
      (i) a database storing data files;
      (ii) a file search unit coupled to search said database and transfer search results to one of said clients;
      (iii) a transfer rule database storing at least a transfer rule, the transfer rule relating to the transfer sequence between said plurality of the clients and specifying information to be transferred to each of the clients via the network at least for each file in said database; and
      (iv) a transfer rule management unit coupled to said transfer rule database and transmitting to a selected client via the network the information specified by a corresponding transfer rule stored in said transfer rule database, said transfer rule management unit expecting information required by said client in succeeding processing steps of said client and transferring data related to the information and stored in said database to one of said client before said client sends a transfer request to said server on the basis of instruction of a user.

2. In a data transfer system comprising:
   (a) a plurality of clients;
   (b) a network coupling said plurality of clients and said server, said server comprising:
      (i) a data base storing data files;
      (ii) a file search unit coupled to search said database and transfer search results to one of said clients;
      (iii) a transfer rule database storing at least a transfer rule, the transfer rule relating to the transfer sequence between said plurality of the clients and specifying transfer information to be transferred to each of the clients via the network at least for each file in said database; and
      (iv) a transfer rule management unit coupled to said transfer rule database and transmitting to a selected client via the network the transfer information specified by a corresponding transfer rule stored in said transfer rule database, each of said clients comprising:
      (v) a search/transfer controller programmed to:
         (1) receive transfer information from said server via said network;

(2) transmit automatically a transfer request based on said transfer information without an instruction by a user to said server before said client sends a transfer request to said server on the basis of instruction of the user; and (3) receive via the network the data related to the file searched by the file search means of said server, based on said transfer request of said client:

(vi) a data storage unit storing data received by said search/transfer controller; and (vii) a display unit displaying data selected from data stored in said data storage unit.

3. A data transfer system according to claim 2, further including a processor in each of said clients coupled to carry out processing of data displayed in said display unit.

4. A data transfer system according to claim 2, further including and information.

5. A data transfer system according to claim 2, further including an information display unit in each of said clients displaying said transfer information.

6. A data transfer system according to claim 3, wherein said data comprise document data.

7. A data transfer system comprising:

(a) a plurality of clients;

(b) a server; and (c) a network coupling said plurality of clients and said server, said server comprising:

(i) a database storing data files;

(ii) file search unit coupled to search said data and transfer search results to one of said clients;

(iii) a transfer rule database storing at least a transfer rule, the transfer rule relating to the transfer sequence between said plurality of the clients and specifying transfer information to be transferred to each of the clients via the network at least for each file in said database, and (iv) a transfer rule management unit coupled to said transfer rule database and transmitting to a selected client via the network the transfer information specified by a corresponding transfer rule stored in said transfer rule stored in said transfer rule database, said transfer rule management unit expecting information required by said client in succeeding processing steps of said client and transferring data related to the information and stored in said databases to one of said client before said client sends a transfer request on the basis of instruction of a user to said server, each of said clients comprising:

(v) an information storage unit receiving and storing said transfer information;

(vi) a search/transfer controller:

(1) utilizing said transfer information stored in said information storage unit to generate a transfer request; and (2) receiving via said network data of a file searched by the file search unit of said server, based on said transfer request;

(vii) a data storage unit storing said received image data; and (viii) a display displaying data stored in said data storage unit.

8. A data transfer system according to claim 7, further including a processing in each of said clients coupled to carry out processing of data displayed in said display unit.

9. A data transfer system according to claim 7, wherein said data comprise document image data.

10. A data transfer system according to claim 7, wherein each of said clients further includes a display displaying the transfer information stored in said information storage unit.

11. A data transfer system comprising:

(a) a plurality of clients;

(b) a server; and (c) a network coupling said plurality of clients and said server, said server comprising:

(i) a database storing data files;

(ii) a data input device at one of said clients coupled to said network and providing data to said database;

(iii) a file search unit coupled to search said database and transfer search results to one of said clients;

(iv) a transfer rule database storing at least a transfer rule, the transfer rule relating to the transfer sequence between said plurality of the clients and specifying a transfer sequence to be transferred to each of the clients via the network at least for each file in said database, and (v) a transfer sequence management unit coupled to said transfer rule database and transmitting to a selected client via the network the transfer sequence information specified by a corresponding transfer rule stored in said transfer rule database a transfer rule management unit expecting information required by said client in succeeding processing steps of said client and transferring data related to the information and stored in said database to one of said client before said client sends a transfer request on the basis of instruction of a user to said server, each of said clients comprising:

(vi) a search/transfer controller programmed to:

(1) receive transfer sequence information transferred from the transfer rule management unit via said network;

(2) transmit a transfer request based on said transfer sequence information; and (3) receive via the network the data related to the file searched by the file search unit of said server, based on said transfer request;

(vii) an data storage unit storing data received by said search/transfer controller; and (viii) a display unit displaying data stored in said storage unit.

12. An data transfer system comprising:

(a) a plurality of clients;

(b) a server; and (c) a network coupling said plurality of clients and said server, said clients generating transfer requests over said network to said server and said server transferring data to said clients in response to said transfer requests over said network, said server comprising:

(i) an database storing data files;

(ii) a data input device at one of said clients coupled to said network and providing data to said database;

(iii) a file search unit coupled to search said database and transfer search results to one of said clients;

(iv) a transfer rule database storing at least a transfer rule, the transfer rule relating to the transfer sequence between said plurality of the clients and specifying transfer sequence information to be transferred to each of the clients via the network at least for each file in said database; and (v) a transfer sequence management unit coupled to said transfer rule database and transmitting to a selected client via the network the transfer sequence information specified by a corresponding transfer rule stored in said transfer rule database, a transfer rule management unit expecting information required by said client in succeeding processing steps of said client and transferring data related to the information and stored in said database to one of said client before said clients sends a transfer request on the basis of instruction of a user to said server, each of said clients comprising:
- (vi) a search/transfer controller programmed to:
  - (1) receive transfer sequence information transferred from the transfer rule management unit via said network;
  - (2) transmit a transfer request based on said transfer sequence information; and
  - (3) receive via the network the data related to the file searched by the file search means of said sever, based on said transfer request;
- (vii) a data storage unit storing data received by said search/transfer controller;
- (viii) a display unit displaying data selected from data stored in said data storage unit;
- (ix) a processor coupled to carry out processing of data displayed in said display unit; and
- (x) said search/transfer controller also programmed to transmit a processed back to said database via said network.

13. A data transfer system comprising:
- (a) a plurality of clients;
- (b) a server; and
- (c) a network coupling said plurality of clients and said server, said clients generating transfer requests over said network to said server and said server transferring data to said clients in response to said transfer requests over said network, said server comprising:
  - (i) a database storing data files;
  - (ii) a data input device at one of said clients coupled to said network and providing data to said database;
  - (iii) a file search unit coupled to search said database and transfer search results to one of said clients;
  - (iv) a transfer condition database storing at least a transfer condition specifying transfer condition information to be transferred to each of the clients via the network at least for each file in said database; and
  - (v) a transfer condition management unit coupled to said transfer condition database and transmitting to a selected client via the network the transfer condition information specified by a corresponding transfer condition stored in said transfer condition database, a transfer rule management unit expecting information required by said clients in succeeding processing steps of said client and transferring data related to the information and stored in said database to one of said client before said client sends a transfer request on the basis of instruction of a user to said server, each of said clients comprising:
- (vi) a search/transfer controller programmed to:
  - (1) receive transfer condition information transferred from the transfer condition management unit via said network;
  - (2) transmit a transfer request based on said transfer condition information; and
  - (3) receive via the network the data related to the file searched by the file search means of said server, based on said transfer request;
- (vii) a data storage unit storing data received by said search/transfer controller;
- (viii) a display unit displaying data selected from data stored in said data storage unit.

14. A data transfer system comprising:
- (a) a plurality of clients;
- (b) a server; and
- (c) a network coupling said plurality of clients and said server, said server comprising:
  - (i) a database storing data files; and
  - (ii) a transfer management unit selecting data from said database and transferring said data to a selected client via said network, said transfer management unit expecting information required by said client in succeeding processing steps of said client and transferring data related to the information and stored in said database to one of said client before said client sends a transfer request on the basis of instruction of a user to said server.

15. A method for transferring data via a network connecting a plurality of clients and a server having a database containing two or more files, comprising the steps of:
- (a) specifying, in advance, at least a transfer rule for each of two or more clients for at least each database file, the transfer rule relating to the transfer sequence between said plurality of the clients;
- (b) storing said transfer rule in said server;
- (c) expecting transfer information required by said client in succeeding processing steps of said client on the basis of the transfer rule;
- (d) transferring data related to the information stored in said database to one of said client to one of said clients via said network before said client sends a transfer request on the basis of instruction of the user to said server, and transmitting a request for data based on the instruction of the user from said one client to said server via said network;
- (e) searching said database for data requested by said one client;
- (f) transferring data obtained in said search to said one client via said network.

16. The method according to claim 15, and further including storing said transfer data at said one client.

17. A method for transferring data via a network connecting a plurality of clients and a server having a database containing two or more files, comprising the steps of:
- (a) specifying, in advance, at least a transfer rule for each of two or more clients via for at least each database file, the transfer rule relating to the transfer sequence between said plurality of the clients;
- (b) storing said transfer rule in said server;
- (c) expecting information required by said client in succeeding processing steps of said client;
- (d) transferring data related to the expected information and stored in said database to one of said client before said clients sends a transfer request on the basis of instruction of the user to said server, the transfer information being transferred to one of said clients via said network and specified by said stored transfer rule;
- (e) transmitting a request for data based on said transfer information from said one client to said server via said network;
- (f) searching said database for data requested by said one client;
- (g) transferring data obtained in said search to said one client via said network;
- (h) storing said transferred data at said one client and
- (i) display said data at said one client.

18. An image data transfer system comprising:

(a) an plurality of clients;

(b) a server; and (c) a network coupling said plurality of clients and said server, said serve transferring image data over said network to said clients based on a file search, said server comprising:

(i) an image database storing image data files;

(ii) a file search unit coupled to search said image database and transfer search results to one of said clients;

(iii) a transfer rule database storing at least a transfer rule, the transfer rule relating to the transfer sequence between said plurality of the clients and specifying transfer information to be transferred to each of the clients via the network at least for each file in said image database; and (iv) a transfer rule management unit coupled to said transfer rule database and transmitting to a selected client via the network the transfer information specified by a corresponding transfer rule stored in said transfer rule database, the image data transferred to a respective one of said clients being based on the transfer information transmitted to said respective client via said network, said transfer rule management unit expecting information required by said client in succeeding processing steps of said client and transferring data related to the information and stored in said image database to one of said client before said client sends a transfer request on the basis of instruction of a user to said server.

19. In am image data transfer system comprising:

(a) a plurality of clients;

(b) a server; and (c) a network coupling said plurality of clients and said server, said server comprising:

(i) an image database storing image data files;

(ii) a file search unit coupled to search said image database and transfer search results to one of said clients;

(iii) a transfer rule database storing at least a transfer rule, the transfer rule relating to the transfer sequence between said plurality of the clients and specifying transfer information to be transferred to each of the clients via the network at least for each file in said image database, and (iv) a transfer rule management unit coupled to said transfer rule database and transmitting to a selected client via the network the transfer information specified by a corresponding transfer rule stored in said transfer rule database, said transfer rule management unit expecting information required by said client in succeeding steps of said client and transferring data related to the information and stored in said image database to one of said client before said client sends a transfer request on the basis of instruction of a user to said server, each of said clients comprising:

(v) a search/transfer controller programmed to:

(1) receive transfer information transferred from said transfer rule management unit via said network;

(2) transmit a transfer request based on said transfer information; and (3) receive via the network the image data related to the file searched by the file search means of said server, based on said transfer request;

(vi) an image data storage unit storing image data received by said search/transfer controller; and (vii) a display unit displaying image data selected from image data stored in said image data storage unit.

20. An method for transferring image data via a network connecting a plurality of clients and a server having an image database containing two or more files, comprising the steps of:

(a) specifying, in advance at least a transfer rule for each of two or more clients for at least each database file, the transfer rule relating to the transfer sequence between said plurality of the clients;

(b) storing said transfer rule in said server;

(c) expecting information required by said client in succeeding processing steps of said client on the basis of the transfer rule;

(d) transferring data related to the information and stored in said image database to one of said client before said client sends a transfer request on the basis of instruction of a user to said server, and transmitting a request for the basis of instruction of a user to said server, and transmitting a request for image database on said transfer information from said one client to said server via said network in the succeeding step of said client;

(e) searching said image database for image data requested by said one client;

(f) transmitting image data obtained in said search to said client via said network.

21. An method for transferring data via a network connecting a plurality of clients and a server a database containing two or more files, comprising the steps of:

(a) specifying, in advance, at least a transfer rule for each of two or more clients via for at least each database file, the transfer rule relating to the transfer sequence between said plurality of the clients;

(b) storing said transfer rule in said server;

(c) expecting transfer information required by said client in succeeding processing steps of said client on the basis of the transfer rule;

(d) transferring data related to the information stored in said database to one of said client to one of said clients via said network before said client sends a transfer request on the basis of instruction of the user to said server, and transmitting a request for data based on the instruction of the user from said one client to said server via said network;

(e) searching said image database for image data requested by said one client;

(f) transferring image data obtained in said search to said one client via said network;

(g) storing said transferred image data at said one client; and (h) displaying said image data at said one client.

* * * * *

UNITED STATES PATENT AND TRADEMARK OFFICE
CERTIFICATE OF CORRECTION

PATENT NO. : 6,725,221 B2
DATED : April 20, 2004
INVENTOR(S) : Tatsuya Murakami et al.

It is certified that error appears in the above-identified patent and that said Letters Patent is hereby corrected as shown below:

<u>Title page,</u>
*Primary Examiner*, name should read:
-- Jean M. Corrielus --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,725,221 B2
APPLICATION NO. : 10/178231
DATED : April 20, 2004
INVENTOR(S) : Tatsuya Murakami et al.

It is certified that error appears in the above-identified patent and that said Letters Patent is hereby corrected as shown below:

<u>In the Title Page:</u>    After the listing of inventors, insert:

(73) Assignee:    Hitachi, Ltd., Tokyo (JP)

Signed and Sealed this

Twenty-sixth Day of June, 2007

JON W. DUDAS
*Director of the United States Patent and Trademark Office*